UNITED STATES PATENT OFFICE.

EDWARD D. KENDALL, OF BROOKLYN, NEW YORK.

METHOD OF TREATING GOLD OR SILVER ORES.

SPECIFICATION forming part of Letters Patent No. 524,690, dated August 14, 1894.

Application filed January 28, 1893. Serial No. 460,132. (No specimens.)

*To all whom it may concern:*

Be it known that I, EDWARD D. KENDALL, a citizen of the United States, and a resident of Brooklyn, in the county of Kings and State of New York, have invented a new and useful Improvement in Methods or Processes of Treating Gold or Silver Ores and a Composition of Matter for the Same Purpose, of which the following is a specification.

In treating ores, I usually grind them until a fine division is obtained. I then prepare two solutions in water, one of sodium di-oxide ($Na_2O_2$), and the other of a suitable cyanide. I prefer to use potassium cyanide (KCN), because of its cheapness. I then unite these two solutions, and mix them with the ore in a divided condition. Suitable proportions would be sodium di-oxide, four pounds dissolved in twenty gallons of water; potassium cyanide fourteen pounds dissolved in eighty gallons of water; divided ore two tons, more or less, as the character of the ore may vary; but I do not limit myself to these proportions; the proportions will vary with the quality of the ore to be treated. I may also accomplish my process by mixing the sodium di-oxide and potassium or other cyanide and ore together in a dry condition and adding water thereto. But the constituents of my composition may be brought together in any required order. I prefer to dissolve the sodium di-oxide in cold water, and the cyanide in a separate portion of water, cold or hot, mixing the two solutions as required in any desired relative proportion. Gold and silver ores and tailings may be treated with my composition by lixiviation, with or without the application of heat, and with or without agitation of the mass. Any suitable receptacle also may be used, as an ordinary leaching tub or rotating cylinders of wood arranged so that the contents may be discharged into a filtering tank.

A portion of the pulverized ore may be treated with my composition containing a relatively small quantity of sodium di-oxide and another portion of the ore may be treated with the lixivium, after having added to this another small quantity of sodium di-oxide or a corresponding solution thereof. As many as five such portions of certain ores may so be successively treated, with intermediate additions of sodium di-oxide, provided the composition was first provided with a sufficient excess of cyanide. The small portion of the composition which remains with the ore after filtration may be washed away with water, and the washings used to prepare fresh portions of the composition. Gold and silver contained in the lixivium may be separated therefrom by electrolysis or other suitable means.

I desire to be understood as disclaiming a process of dissolving gold and silver from ores, which consists in subjecting the ore to the action of a solution of a cyanide and a peroxide, in so far as the same relates broadly to the use of any peroxide, and I further disclaim the process of extracting gold and silver from ores which consists in treating the ores with a solution of a cyanide in the presence of an alkaline di-oxide, in so far as the same relates broadly to the use of any alkaline di-oxide and I limit my claims as follows.

What I claim is—

1. The method of treating gold or silver ores, which consists in mixing sodium di-oxide and a suitable cyanide and water with the ore in a finely divided condition, substantially as described.

2. The method of treating gold or silver ores, which consists in uniting a solution of sodium di-oxide and a solution of a suitable cyanide, and treating the finely divided ore therewith, substantially as described.

3. The method or process of treating gold or silver ores, which consists in uniting a solution of sodium di-oxide and a solution of a suitable cyanide, and mixing the finely divided ore therewith, then drawing the solution from the ore, and separating the metal therefrom, substantially as described.

4. A composition of matter consisting of sodium di-oxide and a suitable cyanide, in solution, to be used in treating gold and silver ores, substantially as described.

In testimony whereof I have hereunto set my hand this 20th day of January, 1893.

EDWARD D. KENDALL.

In presence of—
HOSMER B. PARSONS,
CHAS. F. VINCELETTE.